US008107781B2

(12) United States Patent
Kachmar et al.

(10) Patent No.: US 8,107,781 B2
(45) Date of Patent: Jan. 31, 2012

(54) FIBER OPTIC CABLE

(75) Inventors: Wayne M. Kachmar, North Bennington, VT (US); Ronald J. Kleckowski, Manchester Center, VT (US)

(73) Assignee: ADC Telecommunications, Inc., Eden Praire, MN (US)

( * ) Notice: Subject to any disclaimer, the term of this patent is extended or adjusted under 35 U.S.C. 154(b) by 0 days.

(21) Appl. No.: 12/950,639

(22) Filed: Nov. 19, 2010

(65) Prior Publication Data
US 2011/0150403 A1 Jun. 23, 2011

Related U.S. Application Data

(60) Provisional application No. 61/263,234, filed on Nov. 20, 2009.

(51) Int. Cl.
G02B 6/44 (2006.01)

(52) U.S. Cl. ........ 385/105; 385/100; 385/101; 385/102; 385/103; 385/104; 385/106; 385/107; 385/108; 385/109; 385/110; 385/111; 385/112; 385/113; 385/114

(58) Field of Classification Search ........... 385/100–114
See application file for complete search history.

(56) References Cited

U.S. PATENT DOCUMENTS

| 3,991,014 | A |   | 11/1976 | Kleinschuster |
|---|---|---|---|---|
| 4,067,852 | A |   | 1/1978 | Calundann |
| 4,078,853 | A |   | 3/1978 | Kempf et al. |
| 4,083,829 | A |   | 4/1978 | Calundann et al. |
| 4,130,545 | A |   | 12/1978 | Calundann |
| 4,161,470 | A |   | 7/1979 | Calundann |
| 4,318,842 | A |   | 3/1982 | East et al. |
| 4,374,608 | A |   | 2/1983 | Anderson |
| 4,460,735 | A |   | 7/1984 | Froix |
| 4,468,364 | A |   | 8/1984 | Ide |
| 4,505,541 | A |   | 3/1985 | Considine et al. |
| 4,515,435 | A | * | 5/1985 | Anderson ................. 385/103 |
| 4,550,976 | A |   | 11/1985 | Cooper et al. |
| 4,553,815 | A |   | 11/1985 | Martin |
| 4,623,495 | A |   | 11/1986 | Degoix et al. |
| 4,645,298 | A |   | 2/1987 | Gartside, III |
| 4,659,174 | A |   | 4/1987 | Ditscheid et al. |
| 4,687,294 | A |   | 8/1987 | Angeles |
| 4,693,551 | A |   | 9/1987 | Blanco et al. |
| 4,723,831 | A |   | 2/1988 | Johnson et al. |

(Continued)

FOREIGN PATENT DOCUMENTS

GB 1 483 845 8/1977

(Continued)

OTHER PUBLICATIONS

International Search Report and Written Opinion mailed Jul. 12, 2011.

(Continued)

*Primary Examiner* — Brian M. Healy
*Assistant Examiner* — Guy Anderson
(74) *Attorney, Agent, or Firm* — Merchant & Gould P.C.

(57) ABSTRACT

A fiber optic cable assembly includes an optical fiber, a strength layer surrounding the optical fiber and an outer jacket surrounding the strength layer. The outer jacket includes a base material having a Shore D Hardness of at least 85 and liquid crystal polymer embedded in the base material. The liquid crystal polymer constitutes less than 2% of the outer jacket by weight.

16 Claims, 10 Drawing Sheets

U.S. PATENT DOCUMENTS

| | | | |
|---|---|---|---|
| 4,728,698 A | 3/1988 | Isayev et al. | |
| 4,730,894 A | 3/1988 | Arroyo | |
| 4,765,712 A | 8/1988 | Bohannon, Jr. et al. | |
| 4,767,183 A | 8/1988 | Martin | |
| 4,778,244 A | 10/1988 | Ryan | |
| 4,781,433 A | 11/1988 | Arroyo et al. | |
| 4,798,443 A | 1/1989 | Knipe et al. | |
| 4,807,962 A | 2/1989 | Arroyo et al. | |
| 4,810,834 A | 3/1989 | Grögl et al. | |
| 4,815,813 A | 3/1989 | Arroyo et al. | |
| 4,818,060 A | 4/1989 | Arroyo | |
| 4,826,278 A | 5/1989 | Gartside, III et al. | |
| 4,835,047 A | 5/1989 | Isayev et al. | |
| 4,844,575 A | 7/1989 | Kinard et al. | |
| 4,874,219 A | 10/1989 | Arroyo et al. | |
| 4,875,757 A | 10/1989 | Greveling | |
| 4,895,427 A | 1/1990 | Kraft | |
| 4,906,066 A | 3/1990 | Ryan | |
| 4,909,592 A | 3/1990 | Arroyo et al. | |
| 4,913,517 A | 4/1990 | Arroyo et al. | |
| 4,956,039 A | 9/1990 | Olesen et al. | |
| RE33,459 E | 11/1990 | Bohannon, Jr. et al. | |
| 5,006,402 A | 4/1991 | Isayev | |
| 5,006,403 A | 4/1991 | Isayev | |
| 5,015,063 A | 5/1991 | Panuska et al. | |
| 5,021,475 A | 6/1991 | Isayev | |
| 5,032,433 A | 7/1991 | Isayev et al. | |
| 5,050,957 A | 9/1991 | Hamilton et al. | |
| 5,070,157 A | 12/1991 | Isayev et al. | |
| 5,082,348 A | 1/1992 | Gartside, III et al. | |
| 5,098,177 A | 3/1992 | Tanaka | |
| 5,125,063 A | 6/1992 | Panuska et al. | |
| 5,146,046 A | 9/1992 | Arroyo et al. | |
| 5,148,509 A | 9/1992 | Kannabiran | |
| 5,157,752 A | 10/1992 | Greveling et al. | |
| 5,214,730 A | 5/1993 | Nagasawa et al. | |
| 5,229,851 A | 7/1993 | Rahman | |
| 5,238,638 A | 8/1993 | Isayev | |
| 5,260,380 A | 11/1993 | Isayev | |
| 5,268,225 A | 12/1993 | Isayev | |
| 5,275,877 A | 1/1994 | Isayev | |
| 5,293,442 A | 3/1994 | Sayegh | |
| 5,307,843 A | 5/1994 | Jarrin et al. | |
| 5,320,788 A | 6/1994 | Schneider et al. | |
| 5,345,525 A | 9/1994 | Holman et al. | |
| 5,345,526 A | 9/1994 | Blew | |
| 5,360,497 A | 11/1994 | Schneider et al. | |
| 5,384,880 A | 1/1995 | Keller et al. | |
| 5,557,698 A | 9/1996 | Gareis et al. | |
| 5,561,729 A | 10/1996 | Parris | |
| 5,627,932 A | 5/1997 | Kiel et al. | |
| 5,737,470 A | 4/1998 | Nagano et al. | |
| 5,767,198 A | 6/1998 | Shimizu et al. | |
| 5,809,194 A | 9/1998 | Lovie | |
| 5,838,864 A | 11/1998 | Patel et al. | |
| 5,970,196 A | 10/1999 | Greveling et al. | |
| 5,978,536 A | 11/1999 | Brandi et al. | |
| 6,014,487 A | 1/2000 | Field et al. | |
| 6,052,502 A | 4/2000 | Coleman et al. | |
| 6,088,499 A | 7/2000 | Newton et al. | |
| 6,137,936 A | 10/2000 | Fitz et al. | |
| 6,198,865 B1 | 3/2001 | Risch | |
| 6,249,628 B1 | 6/2001 | Rutterman et al. | |
| 6,256,438 B1 | 7/2001 | Gimblet | |
| 6,321,012 B1 | 11/2001 | Shen | |
| 6,324,324 B1 | 11/2001 | Dixon et al. | |
| 6,356,690 B1 | 3/2002 | McAlpine et al. | |
| 6,400,873 B1 | 6/2002 | Gimblet et al. | |
| 6,419,402 B2 | 7/2002 | Zimmel | |
| 6,459,837 B1 | 10/2002 | Fitz et al. | |
| 6,495,764 B1 | 12/2002 | Hori | |
| 6,500,541 B1 | 12/2002 | Schoeck, Jr. et al. | |
| 6,527,986 B2 | 3/2003 | Blyler, Jr. et al. | |
| 6,576,166 B1 | 6/2003 | Perrin et al. | |
| 6,633,709 B2 | 10/2003 | VanVickle et al. | |
| 6,636,673 B2* | 10/2003 | Register et al. | 385/105 |
| 6,654,527 B2 | 11/2003 | Sakabe et al. | |
| 6,660,182 B2 | 12/2003 | Jester | |
| 6,701,047 B1 | 3/2004 | Rutterman et al. | |
| 6,801,695 B2 | 10/2004 | Lanier et al. | |
| 6,807,347 B2 | 10/2004 | McAlpine et al. | |
| 6,897,382 B2 | 5/2005 | Hager et al. | |
| 6,898,354 B2 | 5/2005 | Kim et al. | |
| 6,901,191 B2 | 5/2005 | Hurley et al. | |
| 6,937,801 B2 | 8/2005 | McAlpine et al. | |
| 7,010,201 B2 | 3/2006 | Risch | |
| 7,011,774 B2 | 3/2006 | Risch | |
| 7,113,680 B2 | 9/2006 | Hurley et al. | |
| 7,180,000 B2 | 2/2007 | Hager et al. | |
| 7,349,642 B2 | 3/2008 | Tatematsu et al. | |
| 7,379,642 B2 | 5/2008 | Kachmar | |
| 7,491,778 B2 | 2/2009 | Flautt et al. | |
| 7,566,474 B2 | 7/2009 | Kachmar | |
| 7,787,727 B2 | 8/2010 | Bringuier et al. | |
| 2002/0025127 A1 | 2/2002 | Graham et al. | |
| 2002/0146563 A1 | 10/2002 | Risch | |
| 2003/0091307 A1 | 5/2003 | Hurley et al. | |
| 2003/0118296 A1 | 6/2003 | Smith | |
| 2003/0161596 A1* | 8/2003 | Register et al. | 385/106 |
| 2004/0105636 A1 | 6/2004 | Cottevieille et al. | |
| 2005/0147363 A1 | 7/2005 | Chastain et al. | |
| 2006/0159407 A1 | 7/2006 | Kachmar | |
| 2006/0280413 A1 | 12/2006 | Paschal et al. | |
| 2006/0291787 A1 | 12/2006 | Seddon | |
| 2007/0127878 A1 | 6/2007 | de Montmorillon et al. | |
| 2007/0280615 A1 | 12/2007 | de Montmorillon et al. | |
| 2008/0095507 A1 | 4/2008 | Mahapatra et al. | |
| 2008/0292254 A1 | 11/2008 | Kachmar | |
| 2009/0317039 A1 | 12/2009 | Blazer et al. | |
| 2010/0046894 A1 | 2/2010 | Kachmar | |
| 2010/0278493 A1* | 11/2010 | Kachmar | 385/110 |
| 2011/0091174 A1* | 4/2011 | Kachmar | 385/113 |

FOREIGN PATENT DOCUMENTS

| | | |
|---|---|---|
| GB | 2 096 343 A | 10/1982 |
| GB | 2 296 575 A | 7/1996 |

OTHER PUBLICATIONS

Description of Fiber Optic Cable—LCF Microcable: Plenum, 6 pages (Aug. 2005).

Fiber Optic Cable LCF Microcable: Plenum, *ADC Telecommunications, Inc.*, 4 pages (Aug. 2005).

ADC Spec Sheet, Fiber Optic Cable, Ruggedized Simplex and Duplex Cables, ADC®, Oct. 2005, 4 pages.

ADC Spec Sheet, Fiber Optic Cable, Tactical Cables, ADC®, Oct. 2005, 4 pages.

Krone Optical Systems, Inc. Krone Technical Data, FiberOptic Cabling Solutions, Ruggedized High Density Cables, 2 pages, Oct. 23, 2003.

Northern Lights Cable, a prestolite wire company, 6th edition, Ruggedized High Density Cables, 3 pages. Publically known at least as early as May 26, 2008.

Superior Essex, FTTP Tight Buffered Indoor/Outdoor Drop, Series W7, RoHS, Product Bulletin, OSP Fiber Products, Nov. 2008, 2 pages.

www.adc.com, Ruggedized High Density Cables, 1 page, Publically known at least as early as May 26, 2008.

* cited by examiner

FIBER OPTIC CABLE

CROSS-REFERENCE TO RELATED APPLICATION

This application claims the benefit of U.S. Provisional Patent Application Ser. No. 61/263,234, filed Nov. 20, 2009, which application is hereby incorporated by reference in its entirety.

BACKGROUND

As fiber to the home is extended into more and different living units, the cables used must provide more and more resistance to difficult installation requirements. In many cases, methods of installing cables made of copper are employed for fiber optic cables. The installation conditions and bend and impact rules are different as copper is a malleable metal and conducts electricity regardless of physical shape and does not degrade significantly under poor installation conditions. Optical fiber cables of small diameter must protect against many new forms of installation abuse that do not affect copper drop cables. These include sensitivity to sharp bends and resistance to impacts such as flat staples installed along structural building components such as beams and trim boards.

SUMMARY

An aspect of the present disclosure relates to a fiber optic cable assembly including an optical fiber, a strength layer surrounding the optical fiber and an outer jacket surrounding the strength layer. The outer jacket includes a base material having a Shore D Hardness of at least 85 and liquid crystal polymer embedded in the base material. The liquid crystal polymer constitutes less than 2% of the outer jacket by weight.

Another aspect of the present disclosure relates to a fiber optic cable assembly including an inner cable assembly. The inner cable assembly includes an optical fiber, a first strength layer surrounding the optical fiber and a first jacket surrounding the strength layer. A second jacket surrounds the inner cable assembly. The second jacket includes a base material having a Shore D Hardness of at least 85 and liquid crystal polymer embedded in the base material. The liquid crystal polymer constitutes less than 2% of the second jacket by weight.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
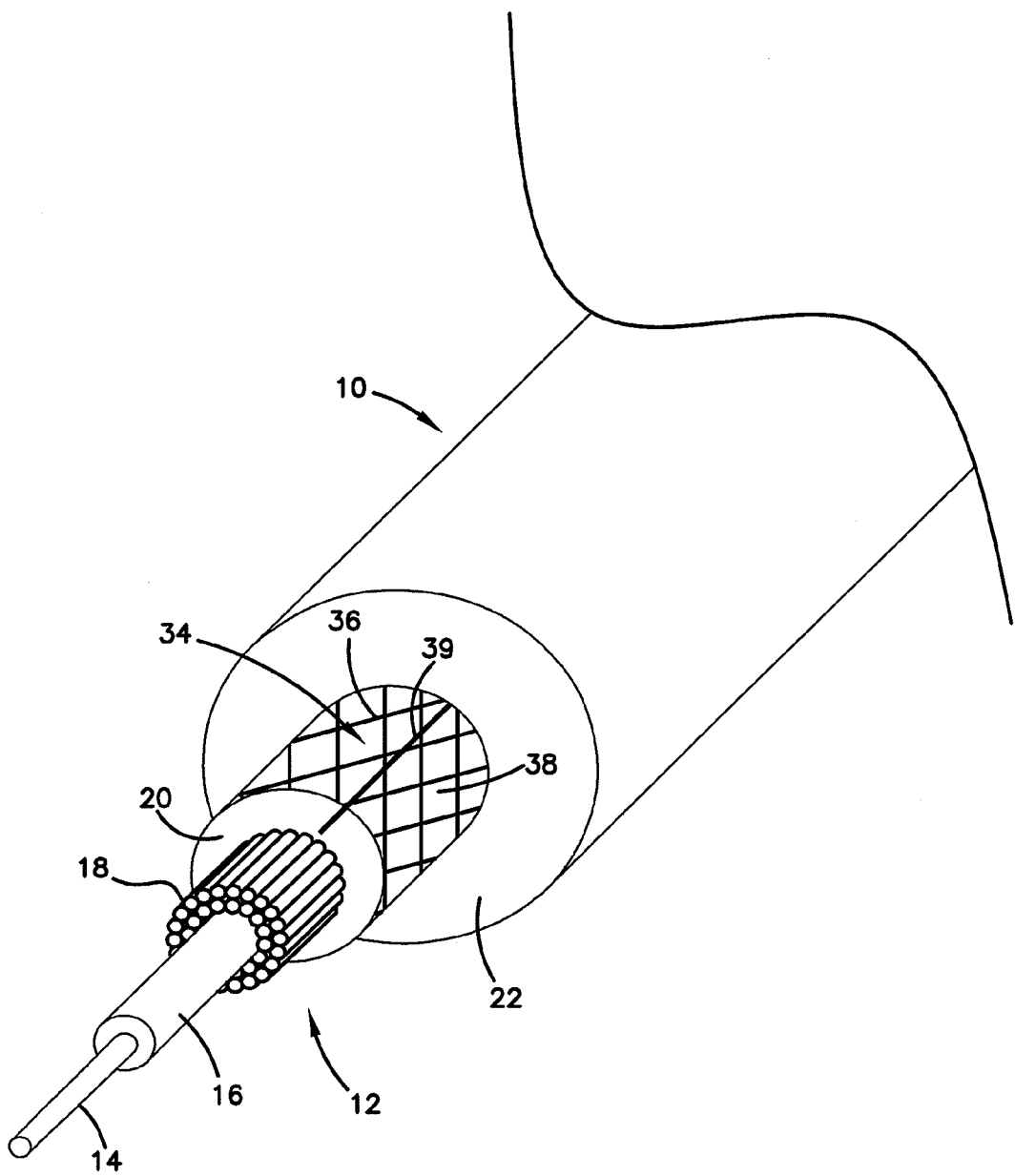
FIG. 1 is a perspective view of a fiber optic cable assembly having exemplary features of aspects in accordance with the principles of the present disclosure.

Referring now to FIG. 1, a fiber optic cable, generally designated 10 is shown. The fiber optic cable 10 includes an inner cable assembly, generally designated 12. The inner cable assembly 12 includes an optical fiber, generally designated 14, a buffer layer 16, a first strength layer 18, and an inner jacket 20. The fiber optic cable 10 further includes an outer jacket 22 disposed about the inner cable assembly 12.

In the subject embodiment, the outer jacket 22 of the fiber optic cable 10 includes an outer diameter that can be sized to prevent or reduce the risk of damage (e.g., crushing, bending, etc.) to the optical fiber 14 during installation. However, as a cable configuration having a larger outer diameter can be difficult to install/route within a compact end location, such as a fiber optic enclosure, at least a portion of the outer jacket 22 can be removed to expose the inner cable assembly 12 having a more compact cable configuration.

Figure 2:
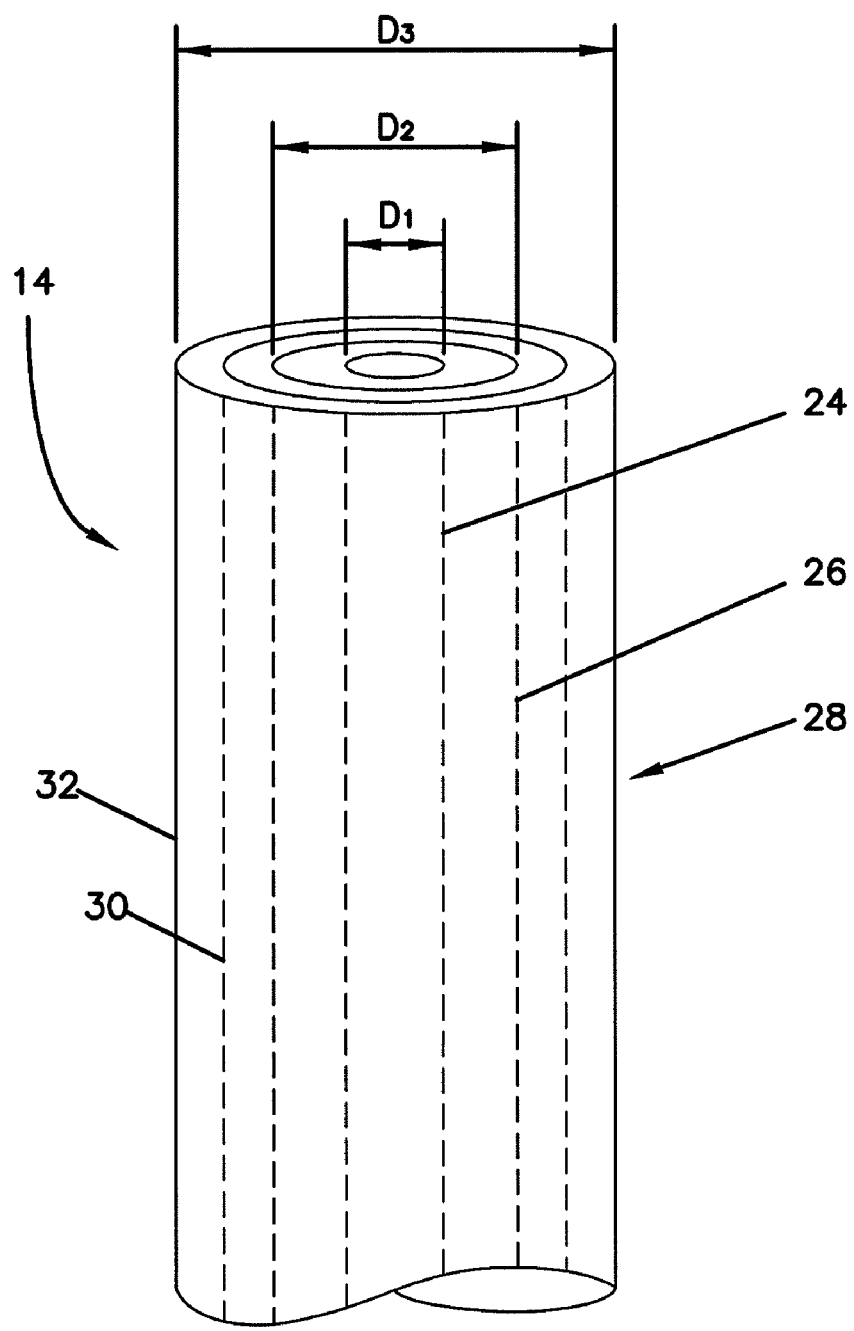
FIG. 2 is perspective view of an optical fiber suitable for use in the fiber optic cable assembly of FIG. 1.

Referring now to FIG. 2, the optical fiber 14 of the inner cable assembly 12 is shown. The optical fiber 14 includes a core 24. The core 24 is made of a glass material, such as a silica-based material, having a first index of refraction. In the subject embodiment, the core 24 has an outer diameter $D_1$ of less than or equal to about 10 µm.

The core 24 of the optical fiber 14 is surrounded by a cladding 26 that is also made of a glass material, such as a silica based-material. The cladding 26 defines a second index of refraction that is less than the first index of refraction defined by the core 24. This difference between the first index of refraction of the core 24 and the second index of refraction of the cladding 26 allows an optical signal that is transmitted through the optical fiber 14 to be confined to the core 24. In the subject embodiment, the cladding 26 has an outer diameter $D_2$ of less than or equal to about 125 µm.

A coating, generally designated 28, surrounds the cladding 26. The coating 28 includes an inner layer 30 and an outer layer 32. In the subject embodiment, the inner layer 30 of the coating 28 is immediately adjacent to the cladding 26 such that the inner layer 30 surrounds the cladding 26. The inner layer 30 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 30 functions to protect the optical fiber 14 from microbending.

The outer layer 32 of the coating 28 is a polymeric material having a higher modulus of elasticity than the inner layer 30. In the subject embodiment, the outer layer 32 of the coating 28 is immediately adjacent to the inner layer 30 such that the outer layer 32 surrounds the inner layer 30. The higher modulus of elasticity of the outer layer 32 functions to mechanically protect and retain the shape of optical fiber 14 during handling. In the subject embodiment, the outer layer 32 defines an outer diameter $D_3$ of less than or equal to about 250 µm. In another embodiment, the outer diameter $D_3$ of the outer layer 32 is in the range of about 242 µm to about 245 µm.

In one embodiment, the optical fiber 14 is manufactured to reduce the sensitivity of the optical fiber 14 to micro or macro-bending (hereinafter referred to as "bend insensitive"). Exemplary bend insensitive optical fibers 14 have been described in U.S. Pat. Application Publication Nos. 2007/0127878, now U.S. Pat. No. 7,623,747, and 2007/0280615, now U.S. Pat. No. 7,587,111, and are hereby incorporated by reference in their entirety. An exemplary bend insensitive optical fiber 14 suitable for use in the inner cable assembly 12 of the fiber optic cable 10 of the present disclosure is commercially available from Draka Comteq under the name BendBright XS.

Referring again to FIG. 1, the buffer layer 16 is depicted as a tight layer that surrounds the optical fiber 14. It will be understood, however, that the scope of the present disclosure is not limited to the buffer layer 16 being a tight layer.

The buffer layer 16 can have any number of conventionally known constructions. For example, the buffer layer 16 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used. In the subject embodiment, the buffer layer 16 defines an outer diameter that is less than or equal to about 1 mm. In another embodiment, the outer diameter of the buffer layer 16 is less than or equal to about 900 µm.

The first strength layer 18 is adapted to inhibit axial tensile loading from being applied to the optical fiber 14. In the subject embodiment, the first strength layer 18 extends the length of the fiber optic cable 10 and is disposed in a generally longitudinal direction along the fiber optic cable 10 between the buffer layer 16 and the inner jacket 20. In certain embodiment, the first strength layer 18 can include yarns, fibers, threads, tapes, films, epoxies, filaments or other structures. In a preferred embodiment, the first strength layer 18 includes a plurality of aramid yarns (e.g., KEVLAR® yarns).

In one embodiment, the plurality of aramid yarns includes an absorbent coating. When the absorbent coating is in contact with non-gaseous fluid (e.g., water), the absorbent coating absorbs the fluid. As the absorbent coating absorbs the fluid, outer diameters of the plurality of aramid yarns with the absorbent coating increase. This increase in the outer diameters of the plurality of aramid yarns blocks the axial and radial flow of non-gaseous fluid in the fiber optic cable 10.

The inner jacket 20 surrounds the first strength layer 18. In one embodiment, the inner jacket 20 includes an outer diameter that is less than or equal to about 18 mm. In the subject embodiment, the inner jacket 20 includes an outer diameter that is less than or equal to about 4 mm. In another embodiment, the outer diameter of the inner jacket 20 is less than or equal to about 3.5 mm. In another embodiment, the outer diameter of the inner jacket 20 is less than or equal to about 3 mm.

In the subject embodiment, the inner jacket 20 includes a base material. In one embodiment, the base material is a polymer material such as a flexible chain polymer (i.e., one in which successive units of the polymer chain are free to rotate with respect to one another, so that the polymer chain can assume a random shape). Example base materials include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials.

In one embodiment, the inner jacket 20 is a tube, such as a furcation tube. The furcation tube 20 defines an inner bore that is adapted to receive the optical fiber 14 after the furcation tube 20 has been installed.

The outer jacket 22 surrounds the inner jacket 20. In the subject embodiment, the outer jacket 22 includes a maximum width W (shown in FIG. 10) or an outer diameter that is less than or equal to about 20 mm. In another embodiment, the maximum width W or outer diameter of the outer jacket 22 is in the range of about 900 µm to about 20 mm. In another embodiment, the maximum width W or outer diameter of the outer jacket 22 is less than or equal to 10 mm. In another embodiment, the outer jacket 22 includes an outer diameter that is in the range of about 900 µm to about 7 mm. In another embodiment, the outer diameter of the outer jacket 22 is about 5.5 mm. In another embodiment, the outer diameter of the outer jacket 22 is about 5 mm. In another embodiment, the outer diameter of the outer jacket 22 is about 3.6 mm. In another embodiment, the outer diameter of the outer jacket 22 is about 3 mm.

In the subject embodiment, the outer jacket 22 includes a base polymer material having a Shore D Hardness of at least 85. The Shore D Hardness of at least 85 is achieved in the outer jacket 22 without any exterior coatings being applied to the outer jacket 22. In one embodiment, the base polymer material is a polyamide 12 (e.g., Nylon 12). Having an outer jacket 22 with a Shore D Hardness of at least 85 allows the fiber optic cable 10 to be directly buried underground or routed through enclosed spaces without using an armor layer around the outer jacket 22. The Shore D Hardness of at least 85 of the outer jacket 22 reduces the risk of rodents damaging the fiber optic cable 10. An exemplary base polymer material suitable for use in the outer jacket 22 is manufactured by EMS-Grivory and is sold under the trade name Grilamid® TR 55.

The base polymer material of the outer jacket 22 is extruded to form the outer jacket 22. In another embodiment, additives may also be added to the base polymer material of the outer jacket 22. Example additives include pigments, fillers, coupling agents, flame retardants, lubricants, plasticizers, ultraviolet stabilizers or other additives.

In one embodiment, the outer jacket 22 has a structure that is adapted to resist post-extrusion shrinkage. For example, the outer jacket 22 may include a plurality of shrinkage reduction materials embedded within the polymer material. An example of shrinkage reduction materials embedded in the outer jacket of a fiber optic cable has been described in U.S. Pat. No. 7,379,642, the disclosure of which is hereby incorporated by reference in its entirety.

In one embodiment, the outer jacket 22 includes a plurality of discrete shrinkage reduction members (e.g., rods, tendrils, extensions, fibers, etc.) embedded within the base material. In one embodiment, the shrinkage reduction members are made from a material that can be softened and reshaped in the extrusion process. In a preferred embodiment, the shrinkage reduction members include liquid crystal polymers. Example liquid crystal polymers are described in U.S. Pat. Nos. 3,991,014; 4,067,852; 4,083,829; 4,130,545; 4,161,470; 4,318,842; and 4,468,364, which are hereby incorporated by reference in their entireties. Liquid crystal polymers are polymers that are anisotropic and highly oriented, even in a softened or liquid phase.

The shrinkage reduction members are preferably elongated and have lengths that are aligned generally parallel to a longitudinal axis of the fiber optic cable 10. Each of the shrinkage reduction members preferably does not extend the entire length of the fiber optic cable 10. Instead, each of the shrinkage reduction members preferably coincides with or extends along only a relatively short segment of the total length of the fiber optic cable 10. For example, in one embodiment, at least some of the shrinkage reduction members have lengths in the range of 0.2 mm-100 mm. In another embodiment, at least some of the shrinkage reduction members have lengths in the range of 5-60 mm. In still another embodiment, at least some of the shrinkage reduction members have lengths in the range of about 10-40 mm. In certain embodiments, a majority of the shrinkage reduction members provided within the base material can be within the size ranges provided above, or within other size ranges. Additionally, most of the shrinkage reduction members are preferably discrete or separate from one another. For example, many of the shrinkage reduction members are preferably separated or isolated from one another by portions of the base material.

To further promote flexibility, the concentration of the shrinkage reduction members is relatively small as compared to the base material. For example, in one embodiment, the shrinkage reduction material constitutes less than 2% of the total weight of the outer jacket 22. In another embodiment, the shrinkage reduction material constitutes less than 1.5% of the total weight of the outer jacket 22. In still another embodiment, the shrinkage reduction material constitutes less than or equal to 1.25% of the total weight of the outer jacket 22. In a further embodiment, the shrinkage reduction material constitutes less than or equal to 1.0% of the total weight of the outer jacket 22. While preferred embodiments use less than 2% of the shrinkage reduction material by weight, other embodiments within the scope of the present invention can use more than 2% by weight of the shrinkage reduction material.

In one embodiment, the inner jacket 20 includes a base polymer material having the same properties as the outer jacket 22. In one embodiment, the inner jacket 20 includes a base polymer material having a Shore D Hardness of at least 85. In another embodiment, the inner jacket 20 includes a plurality of discrete shrinkage reduction members (e.g., rods, tendrils, extensions, fibers, etc.) embedded within the base polymer material. In a preferred embodiment, the shrinkage reduction members include liquid crystal polymers. In still another embodiment, the shrinkage reduction material constitutes less than 2% of the total weight of the inner jacket 20.

Figure 3:
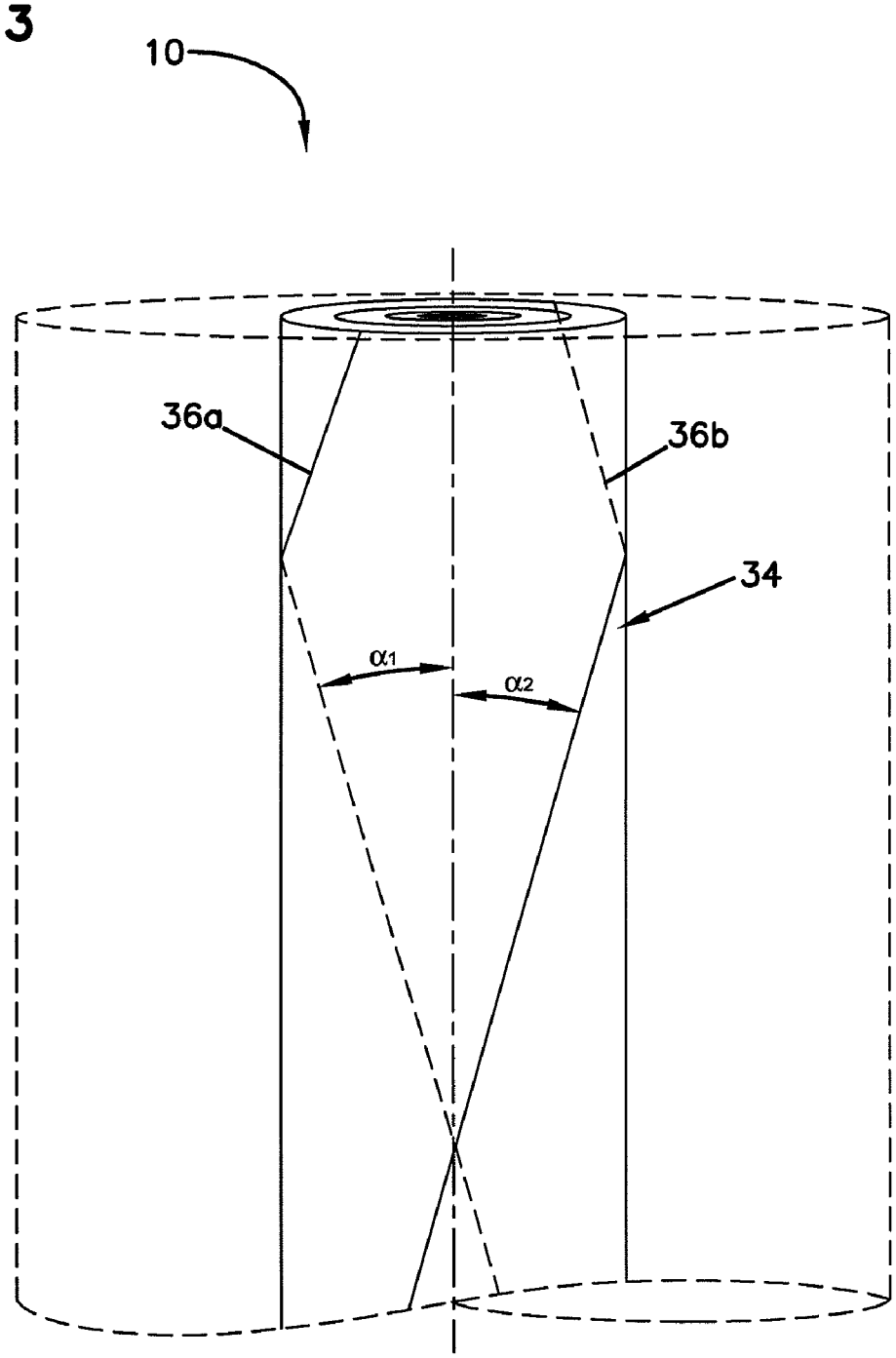
FIG. 3 is a perspective view of a second strength layer suitable for use in the fiber optic cable assembly of FIG. 1.

Referring now to FIGS. 1 and 3, in the subject embodiment, a second strength layer 34 is disposed between the outer jacket 22 and the inner jacket 20. In one embodiment, the strength layer 34 is bonded to the inner jacket 20. In another embodiment, the strength layer 34 is bonded to the outer jacket 22. In another embodiment, the strength layer 34 is bonded to the inner and outer jackets 20, 22.

The second strength layer 34 includes a plurality of strength members 36. In the depicted embodiment of FIG. 3, only two strength members 36 are shown for ease of illustration purposes only.

The strength members 36 are disposed in two sets about the inner jacket 20. In the subject embodiment, the strength members 36 include a first set of strength members 36a and a second set of strength members 36b. The second set of strength members 36b is disposed over the first set of strength members 36a such that the first and second sets of strength members 36a, 36b are unbraided or nonwoven.

In the subject embodiment, the first and second sets of strength members 36a, 36b are contra-helically served. For example, in the depicted embodiment of FIG. 3, the first set of strength members 36a is disposed about the inner jacket 20 in a generally right-handed helical configuration while the second set of strength members 36b is disposed over the first set of strength members 36a in a generally left-handed helical configuration. The first and second sets of strength members 36a, 36b are disposed at angles $\alpha_1$, $\alpha_2$ from a longitudinal line 37. In one embodiment, the angles $\alpha_1$, $\alpha_2$ are equal but opposite. In another embodiment, the angles $\alpha_1$, $\alpha_2$ are in the range of about 0.1 degrees to about 20 degrees. In another embodiment, the angles $\alpha_1$, $\alpha_2$ are in the range of about 5 degrees to about 20 degrees. In another embodiment, the angles $\alpha_1$, $\alpha_2$ are in the range of about 0.1 degrees to about 15 degrees. In another embodiment, the angles $\alpha_1$, $\alpha_2$ are in a range of about 1 degree to about 15 degrees. In another embodiment, the angles $\alpha_1$, $\alpha_2$ are in the range of about 5 degrees to about 15 degrees. In another embodiment, the angles $\alpha_1$, $\alpha_2$ are in a range of about 0.1 degrees to about 5 degrees. In another embodiment, the angles $\alpha_1$, $\alpha_2$ are in a range of about 0.1 degrees to about 1 degree. This contra-helical orientation of the first and second sets of strength members 36a, 36b protects the fiber optic cable 10 from twisting as the fiber optic cable 10 is axially pulled by a cable puller.

In the subject embodiment, each of the strength members 36 has a lay length in a range of about 3 inches to about 18 inches. The lay length is the axial distance in which each of the strength members 36 wraps 360° around the inner jacket 20.

The first and second sets of strength members 36 define a plurality of openings 38. In the subject embodiment, the openings 38 are generally diamond shaped. In one embodiment, an outwardly facing surface of the inner jacket 20 bonds to an inner surface of the outer jacket 22 through the plurality of openings 38 in the second strength layer 34.

In one embodiment, the strength members 36 in the second strength layer 34 are strands of aramid yarn. In another embodiment, the strength members 36 are ribbonized fiberglass. In one embodiment, there are one to ten strength members 36 in the first set of strength members 36a and one to ten strength members 36 in the second set of strength members 36b. In another embodiment, there are one to eight strength members 36 in the first set of strength members 36a and one to eight strength members 36 in the second set of strength members 36b. In another embodiment, there are four strength members 36 in the first set of strength members 36a and four strength members 36 in the second set of strength members 36b.

Referring again to FIG. 1, the fiber optic cable 10 includes a ripcord 39. The ripcord 39 is disposed between the second strength layer 34 and the outer jacket 22 and extends the length of the fiber optic cable 10. In the one embodiment, and by way of example only, the fiber optic cable 10 includes two ripcords 39 that are oppositely disposed about the circumference of the second strength layer 34. The ripcord 39 is adapted to form a longitudinal split 40 (shown in FIG. 4) in the outer jacket 22 when pulled in a direction that is radially outward from the inner cable assembly 12. The longitudinal split 40 in the outer jacket 22 allows for the outer jacket 22 to be removed thereby exposing the inner cable assembly 12.

In one embodiment, the ripcord 39 is a polyester material. In another embodiment, the ripcord 39 is a nylon material. In another embodiment, the ripcord 39 is coated KEVLAR®.

In another embodiment, the longitudinal split 40 is created using a tool having a sharp edge, such as a knife. In this embodiment, the outer jacket 22 is cut in a longitudinal direction and removed such that the inner jacket 20 is exposed.

In another embodiment, the longitudinal split 40 is created using one of the strength members 36 from the second set of strength members 36b. In this embodiment, the strength member 36 acts similarly to the ripcord 39.

Figure 4:
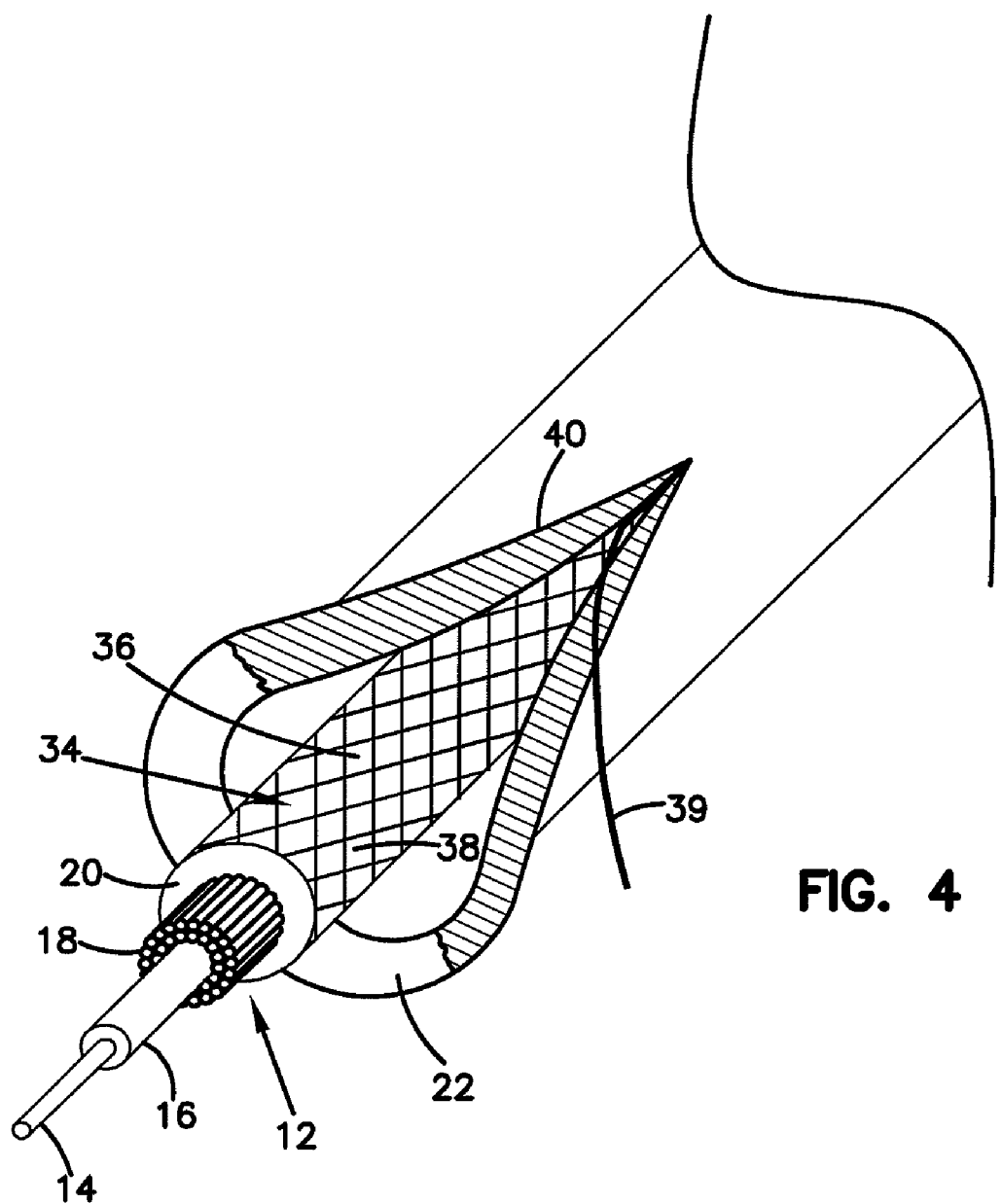
FIG. 4 is a perspective view of the fiber optic cable assembly of FIG. 1 with a portion of a second jacket being removed.

Referring now to FIG. 4, the removal of the outer jacket 22 of the fiber optic cable 10 using the ripcord 39 is shown. The ripcord 39 is pulled in a direction that is outward from inner cable assembly 12. As the ripcord 39 is pulled outward from the inner cable assembly 12, the ripcord 39 separates from the inner cable assembly 12 and forms the longitudinal split 40 in the outer jacket 22. The ripcord 39 is pulled until the longitudinal split 40 extends a desired axial distance along the fiber optic cable 10.

With the longitudinal split 40 formed in the outer jacket 22, at least a portion of the outer jacket 22 can be removed by pulling the outer jacket 22 away from the inner cable assembly 12. In one embodiment, the removed portion of the outer jacket 22 is cut away from the fiber optic cable 10 after the outer jacket 22 has been removed. In another embodiment, the outer jacket 22 is circumferentially scored at a score line disposed at the desired axial distance prior to pulling the ripcord 39 such that the score line extends through the outer jacket 22. In this embodiment, the ripcord 39 is pulled to the score line after which the outer jacket 22 is removed.

In the subject embodiment, as the ripcord 39 is disposed between the second strength layer 34 and the outer jacket, the removal of the outer jacket 22 exposes the second strength layer 34. With the outer jacket 22 removed, the second strength layer 34 can be separated from the inner cable assembly 12 and anchored to structure (e.g., bulkhead, pulling grip, connector assembly, etc.).

With at least a portion of the outer jacket 22 removed from the fiber optic cable 10, a portion of the inner cable assembly 12 is exposed. As the inner cable assembly 12 includes an outer diameter that is less than the outer diameter of the outer jacket 22, the inner cable assembly 12 can be used with components (e.g., enclosures, splice trays, connectors, etc.) that may require smaller diameter cables while still being protected by the inner jacket 20 and the first strength layer 18.

Figure 5:
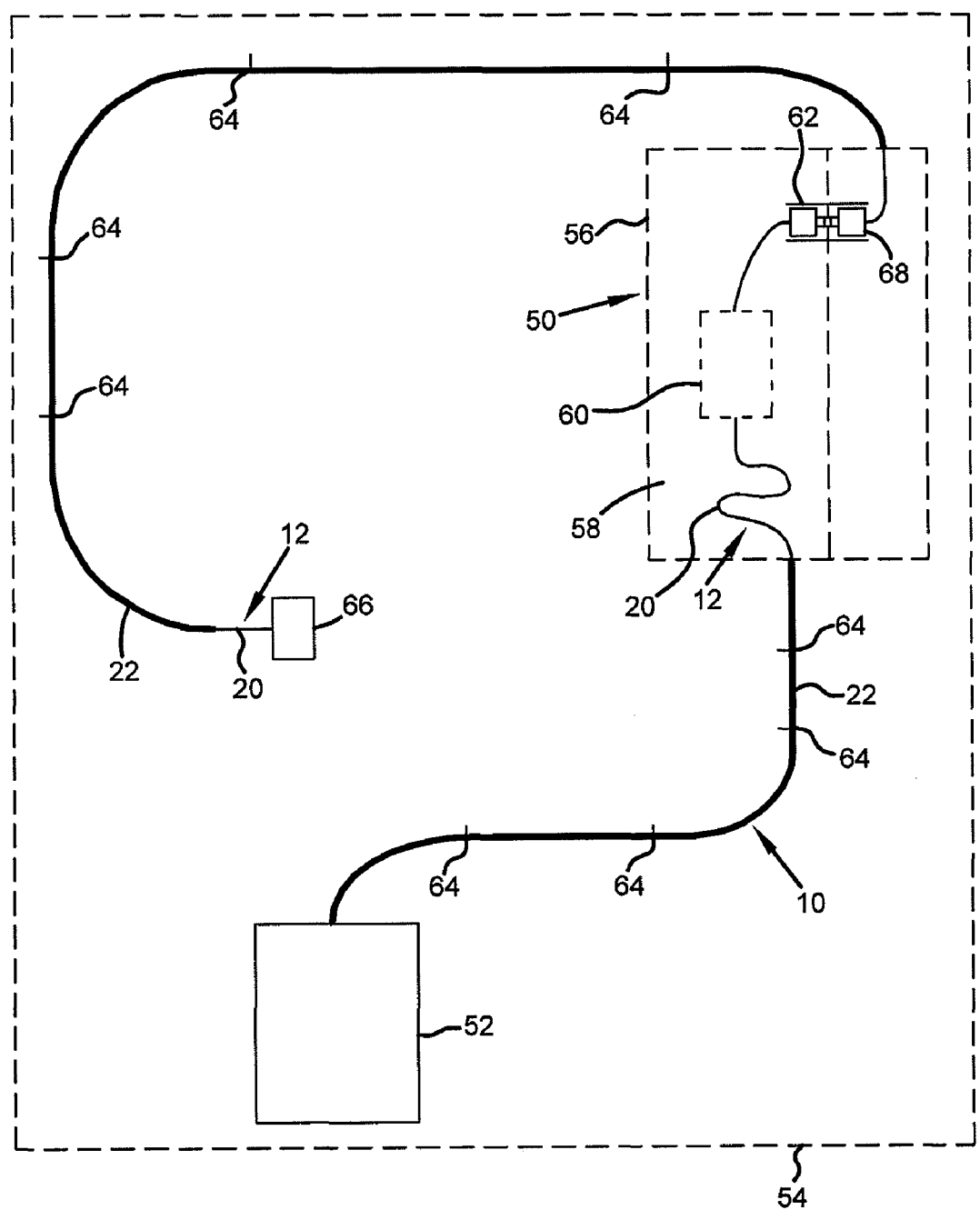
FIG. 5 is a schematic representation of a fiber optic network using the fiber optic cable assembly of FIG. 1.

Referring now to FIG. 5, a simplified schematic representation of an exemplary use of the fiber optic cable 10 is shown. In the subject embodiment, the fiber optic cable 10 optically connects a fiber optic enclosure, generally designated 50, to a fiber distribution hub 52 in a facility 54. The fiber optic enclosure 50 includes a body 56 defining an interior cavity 58. A splice tray 60 and a termination bank 62 are disposed within the interior cavity 58 of the fiber optic enclosure 50.

As the outer diameter of the outer jacket 22 is larger than the outer diameter of the inner jacket 20, the outer jacket 22 of the fiber optic cable 10 provides an added layer of protection to the optical fiber 14. This added layer of protection is potentially advantageous during installation of the fiber optic cable 10 between the fiber optic enclosure 50 and the fiber distribution hub 52. For example, in the depicted embodiment, the fiber optic cable 10 is secured between the fiber optic enclosure 50 and the fiber distribution hub 52 with a plurality of staples 64. The outer jacket 22 protects the optical fiber 14 from being crushed or damaged by the staples 64.

While the outer jacket 22 protects the optical fiber 14 between the fiber optic enclosure 50 and the fiber distribution hub 52, the outer diameter of the outer jacket 22 may be too large for use within some fiber optic enclosures. As added protection of the optic fiber 14 is not necessary within the fiber optic enclosure 50, at least a portion of the outer jacket 22 and the second strength layer 34 can be removed from the fiber optic cable 10 using the method described above. With the outer jacket 22 and the second strength layer 34 removed, the inner cable assembly 12 is exposed. The inner cable assembly 12 can then be routed within the fiber optic enclosure 50. In the subject embodiment, the inner cable assembly 12 is routed to the splice tray 60.

In the depicted embodiment of FIG. 5, another fiber optic cable 10 is routed between the fiber optic enclosure 50 and an end location 66. In the depicted embodiment, the outer jacket 22 and the second strength layer 34 are removed at the ends of the fiber optic cable 10. At one end of the fiber optic cable 10, the inner cable assembly 12 is disposed within the fiber optic enclosure 50. The end of the inner cable assembly 12 includes a connector 68, which can be adapted for optical connection in a fiber optic adapter disposed within the termination bank 62. At the other end, the inner cable assembly 12 of the fiber optic cable 10 is optically connected to the end location 66. In the depicted embodiment of FIG. 5, the fiber optic cable 10 is secured between the fiber optic enclosure 50 and the end location 66 by staples 64.

Figure 6:
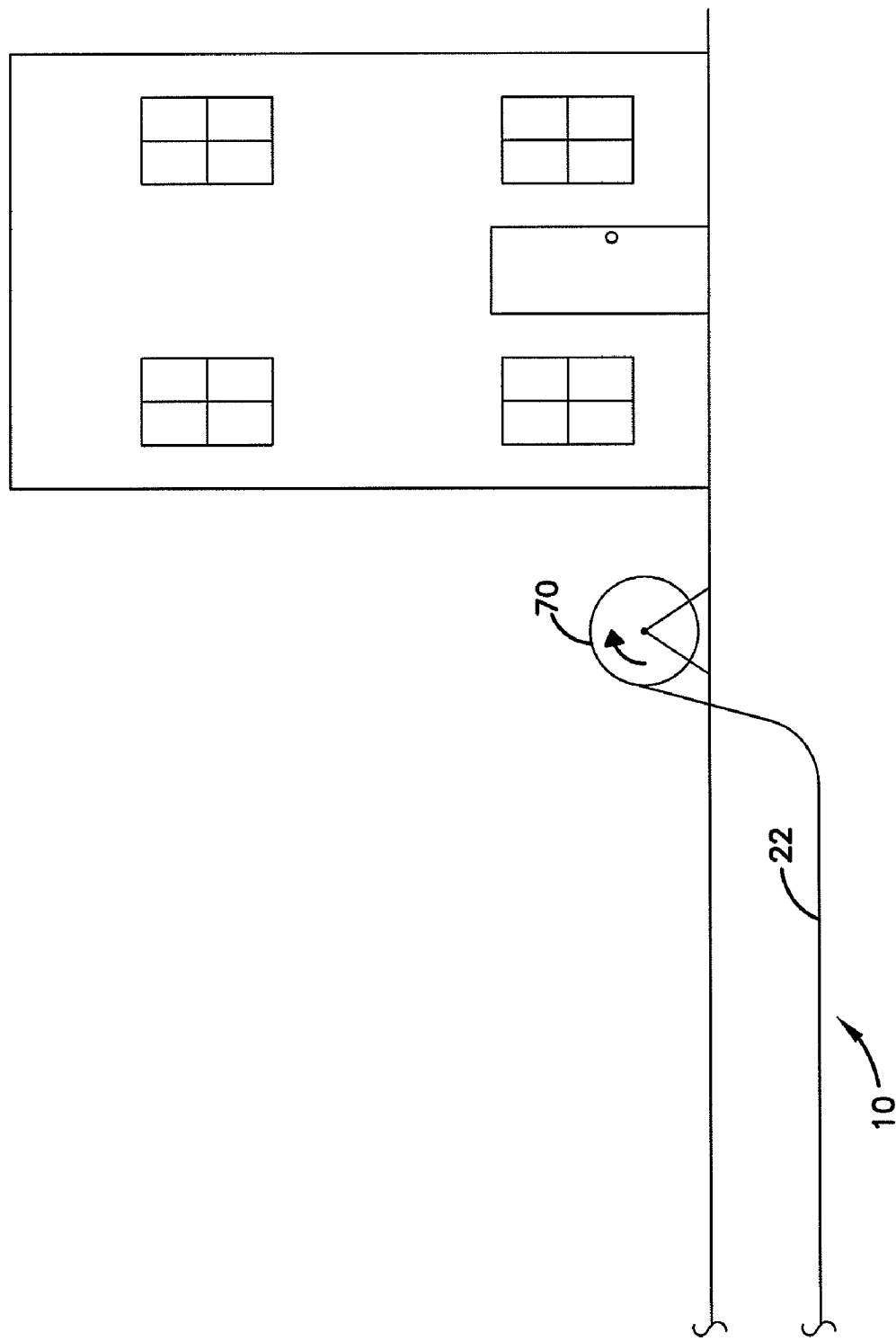
FIG. 6 is a schematic representation of a cable puller pulling the fiber optic cable assembly of FIG. 1.

Referring now to FIG. 6, a simplified schematic representation of another exemplary use of the fiber optic cable 10 is shown. In the depicted embodiment of FIG. 6, at least a portion of the fiber optic cable 10 is disposed underground. In one embodiment, the fiber optic cable 10 is directly buried underground. In another embodiment, the fiber optic cable 10 is disposed in a conduit that is underground.

A cable puller 70 is connected to one end of the fiber optic cable 10. With the second strength layer 34 anchored to the cable puller 70, the cable puller 70 pulls the fiber optic cable 10 through the ground. As previously stated, the contra-helical orientation of the strength members 36 of the second strength layer 34 prevent the fiber optic cable 10 from twisting as the cable puller 70 pulls the fiber optic cable 10.

Figure 7:
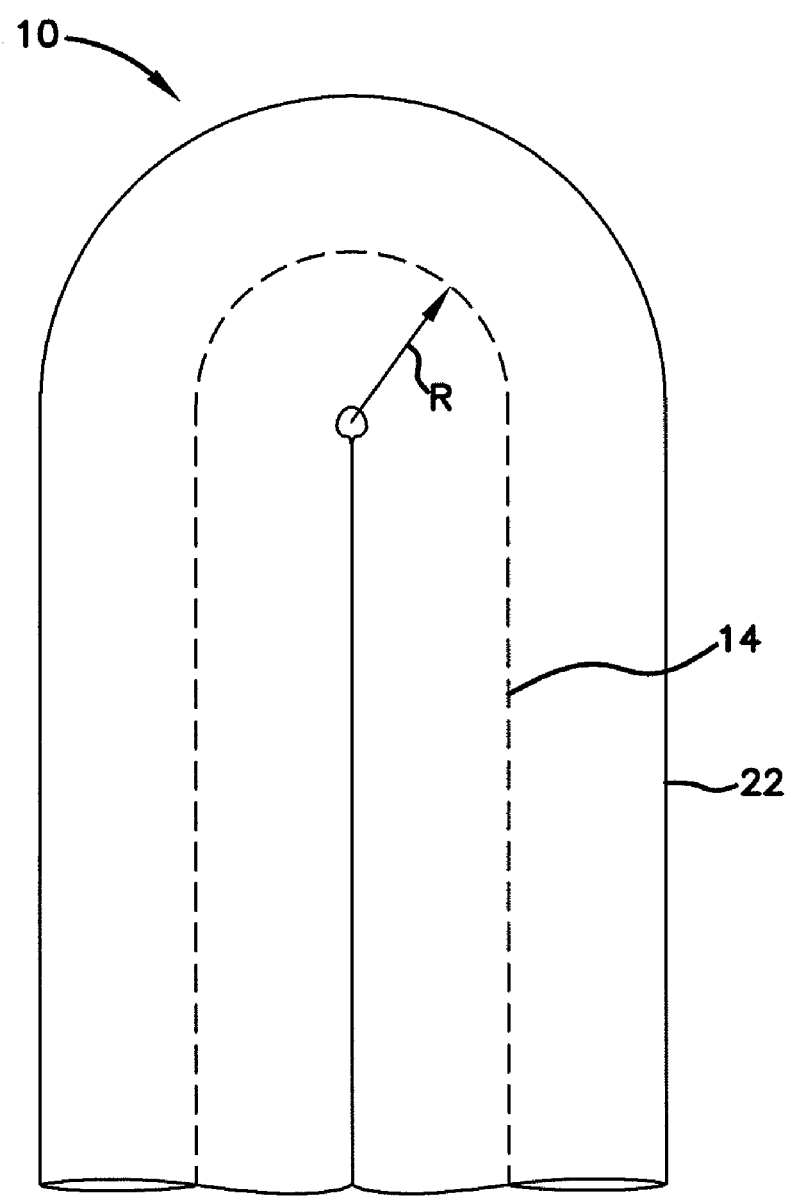
FIG. 7 is a perspective view of the fiber optic cable assembly of FIG. 1 in a bent orientation.

Referring now to FIG. 7, in one embodiment, the outer diameter of the outer jacket 22 prevents or reduces the risk of damage from kinking of the fiber optic cable 10. Kinking of the fiber optic cable 10 occurs when the fiber optic cable 10 is bent around about 180 degrees or more. If the radius of the outer jacket 22 is larger than the minimum bend radius R of the optical fiber 14, the outer jacket 22 prevents the optical fiber 14 from being bent beyond the minimum bend radius R of the optical fiber 14 if the fiber optic cable 10 is kinked.

The fiber optic cable 10 of the present disclosure is potentially advantageous because it provides a rugged outer jacket 22 that can be selectively removed to expose a more compact inner cable assembly 12. In one embodiment, the outer jacket 22 and the second strength layer 34 allow the fiber optic cable 10 to be buried and pulled through the ground by a cable puller 70. In another embodiment, the outer jacket 22 provides added protection to the optical fiber 14 of the inner cable assembly 12 for installation.

The selective removability of the outer jacket 22 is potentially advantageous since it provides access to the inner cable assembly 12. This access allows the fiber optic cable 10 to be used with fiber optic components (e.g., enclosures, splices, connectors, etc.) that are adapted for use with smaller fiber optic cables. Another potential advantage of the selective removability of the outer jacket 22 is that a portion of the outer jacket 22 can be removed to allow the inner cable assembly 12 to be stored in a fiber optic enclosure 50. As the inner cable assembly 12 includes an outer diameter that is less than the outer diameter of the outer jacket 22, the inner cable assembly 12 can be more compactly stored (e.g., around a cable spool in a fiber optic enclosure) within the fiber optic enclosure 50.

Figure 8:
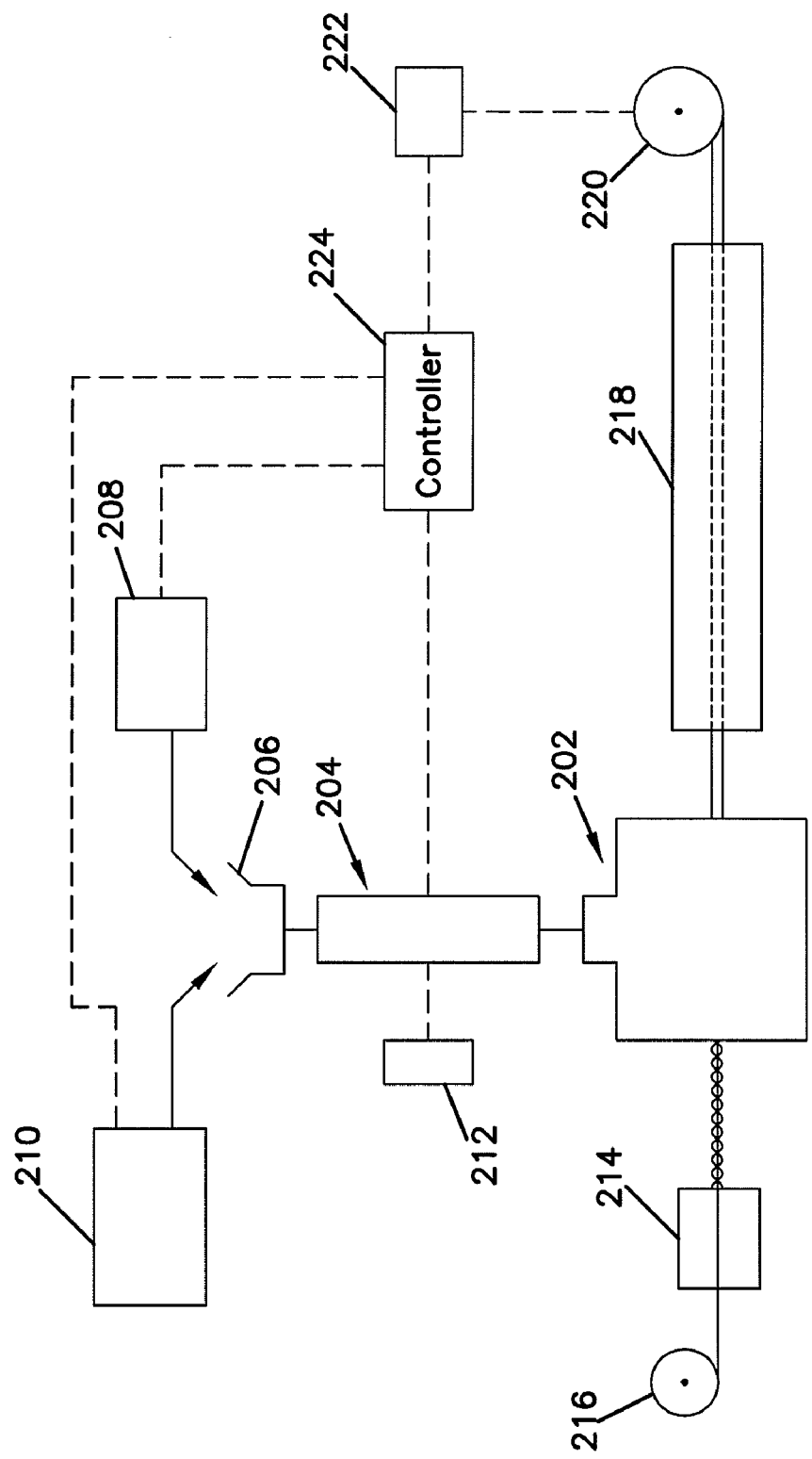
FIG. 8 is a schematic representation of a process suitable for manufacturing the fiber optic cable assembly of FIG. 1.

Referring now to FIG. 8, a schematic representation of a system 200 for manufacturing the fiber optic cable 10 will be described. The system 200 includes a crosshead, generally designated 202, that receives thermoplastic material from an extruder 204. A hopper 206 is used to feed materials into the extruder 204. A first conveyor 208 conveys the base material to the hopper 206. A second conveyor 210 conveys the shrinkage reduction material to the hopper 206. The extruder 204 is heated by a heating system 212 that may include one or more heating elements for heating zones of the extruder 204 as well as the crosshead 202 to desired processing temperatures.

The inner cable assembly 12 is fed into a torque balanced yarn server 214 from a feed roll 216. The torque balanced yarn server 214 contra-helically wraps the first and second sets of strength members 36a, 36b about the inner cable assembly 12. The inner cable assembly 12 with the second strength layer 34 surrounding the inner cable assembly 12 is fed into the crosshead 202.

A water trough 218 is located downstream from the crosshead 202 for cooling the extruded product that exits the crosshead 202. The cooled final product is stored on a take-up roll 220 rotated by a drive mechanism 222. A controller 224 coordinates the operation of the various components of the system 200.

Figure 9:
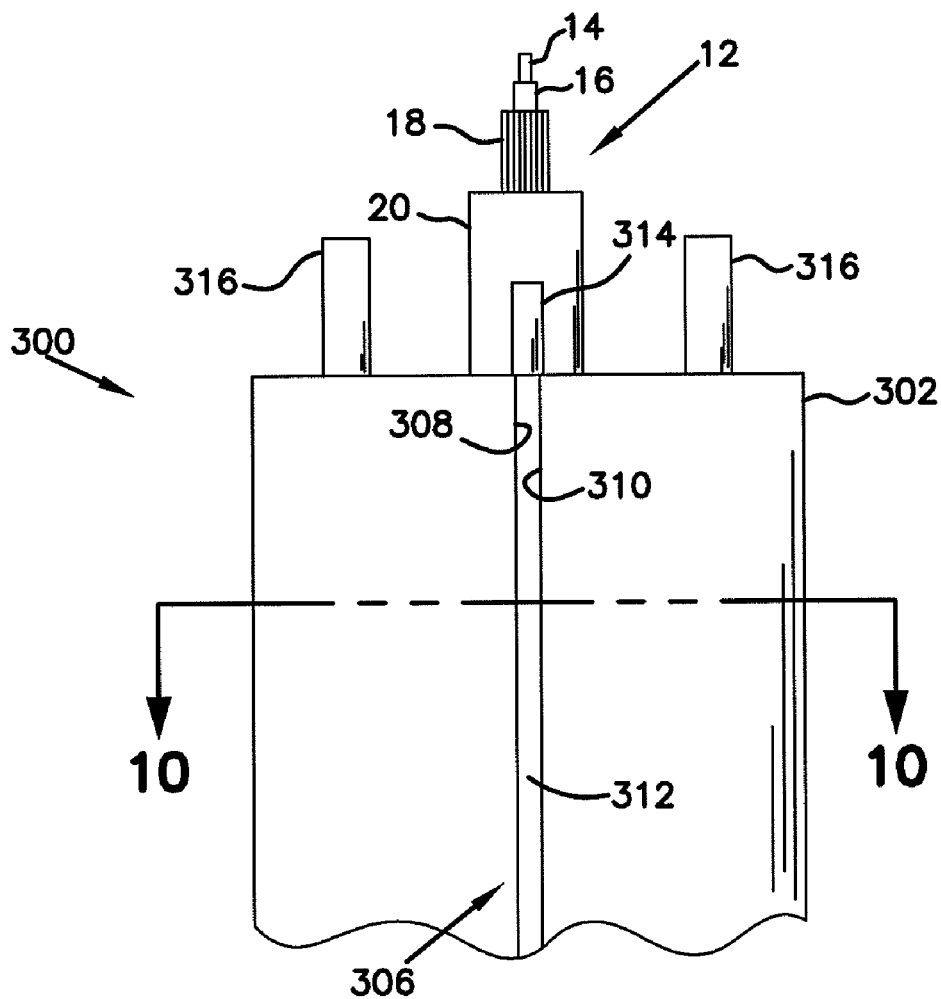
FIG. 9 is a front view of a fiber optic drop cable assembly having features that are examples of aspects in accordance with the principles of the present disclosure.
Figure 10:
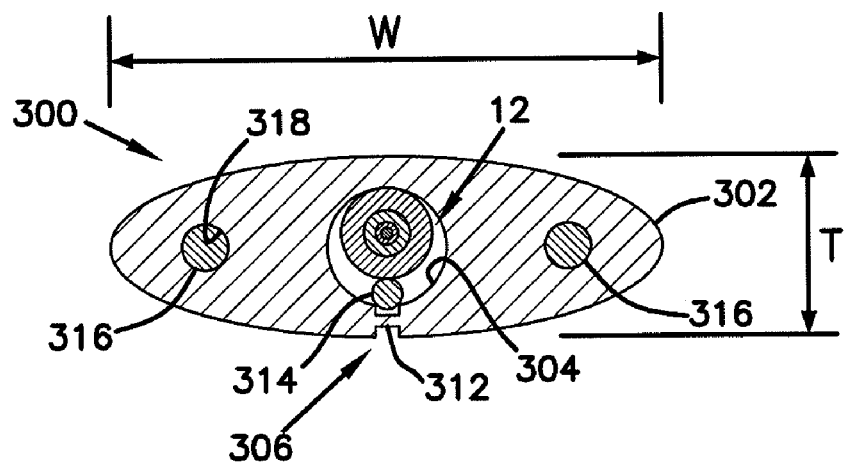
FIG. 10 is a cross-sectional view of the fiber optic drop cable assembly taken on line 10-10 of FIG. 9.

Referring now to FIGS. 9 and 10, a fiber optic drop cable assembly, generally designated 300, is shown. In the depicted embodiment, the fiber optic drop cable assembly 300 is a generally flat cable assembly. It will be understood, however, that the scope of the present disclosure is not limited to the fiber optic drop cable assembly 300 being a generally flat cable assembly.

The fiber optic drop cable assembly 300 includes the inner cable assembly 12. The inner cable assembly 12 includes the optical fiber 14, the buffer layer 16, the first strength layer 18, and the inner jacket 20.

The fiber optic drop cable assembly 300 further includes an outer jacket 302 disposed about the inner cable assembly 12. The outer jacket 302 has a width W and a thickness T. In the subject embodiment, the width W of the outer jacket 302 is greater than the thickness T. With the outer jacket 302 having a width W that is greater than a thickness T of the outer jacket 302, the fiber optic drop cable assembly 300 has an elongated transverse cross-section. In one embodiment, the elongated transverse cross-section of the outer jacket 302 of the fiber optic drop cable assembly 300 is generally obround. In another embodiment, the elongated transverse cross-section of the outer jacket 302 of the fiber optic drop cable assembly 300 is generally oval.

In the subject embodiment, the outer jacket 302 of the fiber optic drop cable assembly 300 includes a base polymer material having a Shore D Hardness of at least 85. In one embodiment, the base polymer material is a polyamide 12. Additives may also be added to the material. Example additives include pigments, fillers, coupling agents, flame retardants, lubricants, plasticizers, ultraviolet stabilizers or other additives. In one embodiment, the material of the outer jacket 302 is the same as the material of the inner jacket 20. In another embodiment, the material of the outer jacket 302 is different than the material of the inner jacket 20.

The outer jacket 302 defines a cable opening 304 that extends the length of the fiber optic cable 300. The cable opening 304 is sized to receive at least the inner cable assembly 12.

At least a portion of the outer jacket 302 of the fiber optic drop cable assembly 300 can be selectively removed to expose the inner cable assembly 12. The outer jacket 302 further defines a longitudinal split, generally designated 306. In one embodiment, the longitudinal split 306 extends the length of the fiber optic drop cable assembly 300. The longitudinal split 306 includes a first longitudinal end 308 and an oppositely disposed second longitudinal end 310.

In the subject embodiment, a web 312 connects the first and second longitudinal ends 308, 310 of the longitudinal split 306. The web 312 acts as a line of weakness at which the outer jacket 302 can be selectively opened. The web 312 is a thin strip of material having a thickness that is less than a thickness of the outer jacket 302 between an outer surface of the outer jacket 302 and the cable opening 304. In the subject embodiment, the web 312 is made of the same material as the outer jacket 302.

In the subject embodiment, a ripcord 314 is disposed in the cable opening 304 between the inner jacket 20 of the inner cable assembly 12 and the outer jacket 302. The ripcord 314 extends the length of the fiber optic drop cable assembly 300. In the subject embodiment, the ripcord 314 is adapted to tear through the web 312 when subjected to a pulling force in a direction that is radially outward from the inner cable assembly 12. As the ripcord 314 is pulled, the first and second longitudinal ends 308, 310 of the longitudinal split 306 separate, thereby providing a location at which the inner cable assembly 12 can be removed from the outer jacket 302.

In one embodiment, the ripcord 314 is a polyester material. In another embodiment, the ripcord 314 is a nylon material. In another embodiment, the ripcord 314 is coated KEVLAR®.

Figure 11:
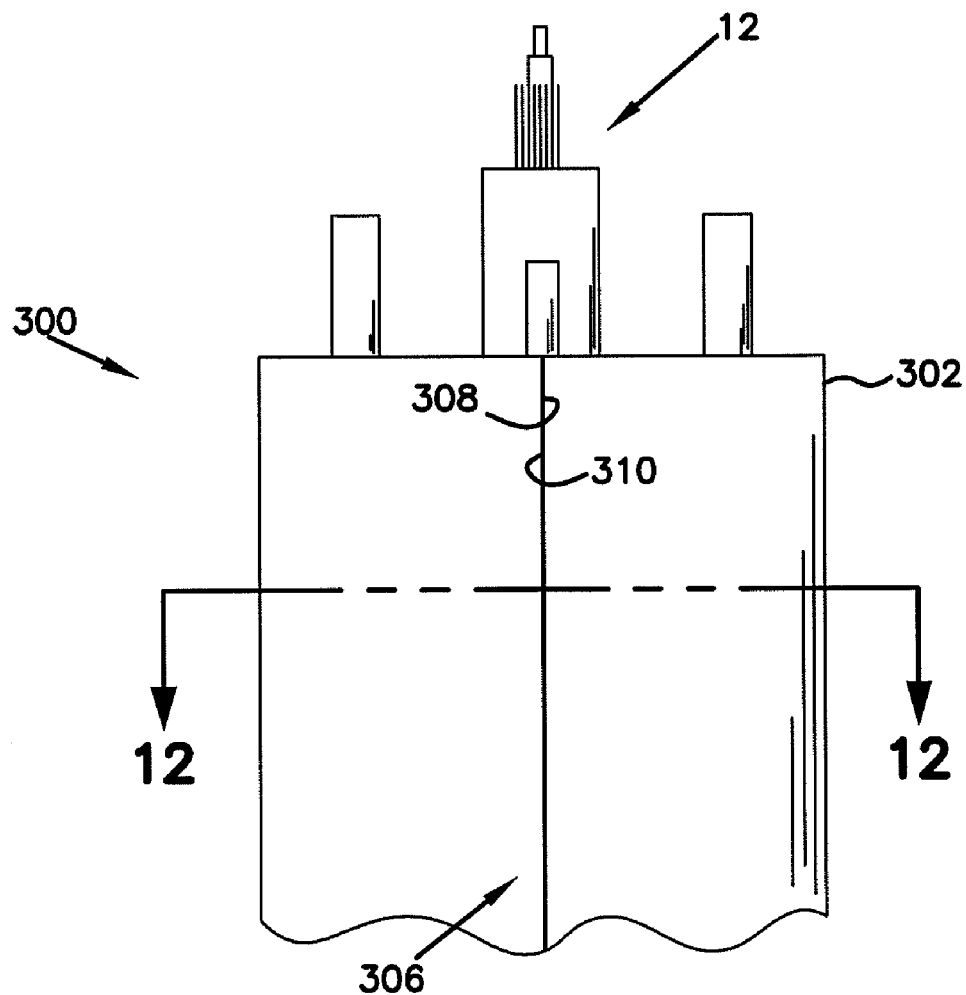
FIG. 11 is a front view of an alternate embodiment of the fiber optic drop cable assembly of FIG. 9.
Figure 12:
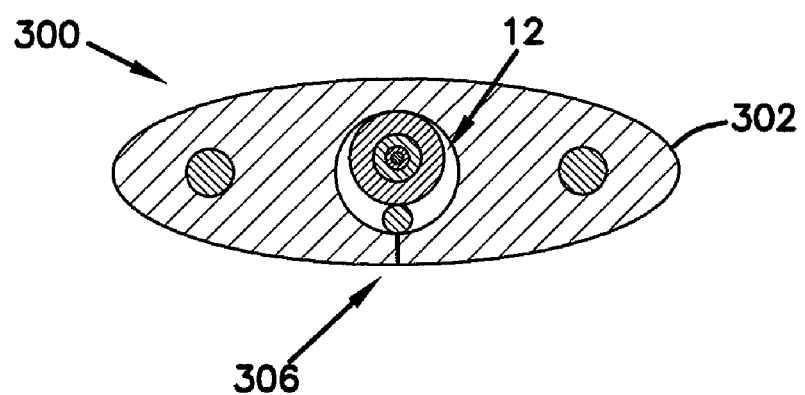
FIG. 12 is a cross-sectional view of the fiber optic drop cable assembly taken on line 12-12 of FIG. 11.

Referring now to FIGS. 11 and 12, an alternate embodiment of the longitudinal split 306 is shown. The longitudinal split 306 includes the first longitudinal end 308 and the second longitudinal end 310. In the subject embodiment, the first and second longitudinal ends 308, 310 are held closed by the inherent mechanical properties of the outer jacket 302, which bias the outer jacket 302 to a closed position. In another embodiment, the first and second longitudinal ends 308, 310 can be held in the closed position by a thermal weld. In another embodiment, the first and second longitudinal ends 308, 310 can be held in the closed position by an adhesive or a bonding agent disposed on at least one of the first and second longitudinal ends 308, 310.

Referring again to FIGS. 9 and 10, the fiber optic drop cable assembly 300 further includes one or more reinforcing members 316. The reinforcing members 316 are adapted to inhibit axial tensile and/or compressive loading from being applied to the inner cable assembly 12. The reinforcing members 316 preferable extend the entire length of the fiber optic drop cable assembly 300. The reinforcing members 316 are positioned outside of the inner jacket 20 of the inner cable assembly 12. In the depicted embodiment of FIGS. 9 and 10, the reinforcing members 316 are disposed in passageways 318 in the outer jacket 302 of the fiber optic cable assembly 300. The passageways 318 in the outer jacket 302 extend the length of the outer jacket 302.

In the depicted embodiment of FIGS. 9 and 10, the fiber optic drop cable assembly 300 includes two reinforcing members 316. The reinforcing members 316 are symmetrically arranged about the inner jacket 20 of the inner cable assembly 12. In the depicted embodiment, the reinforcing members 316 are disposed 180 degrees apart about the inner jacket 20 of the inner cable assembly 12. In the subject embodiment, and by way of example only, the reinforcing members 316 include reinforcing rods (e.g., a glass reinforced plastic rod having glass rovings in an epoxy base, a metal rod, a liquid crystal polymer rod, etc.) that extend lengthwise along the entire length of the fiber optic drop cable assembly 300.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable comprising:
an optical fiber;
a strength layer surrounding the optical fiber; and
an outer jacket surrounding the strength layer, the outer jacket including a base material having a Shore D Hardness of at least 85 and liquid crystal polymer embedded in the base material, the liquid crystal polymer constituting less than 2% of the outer jacket by weight.

2. A fiber optic cable as claimed in claim 1, wherein the base material is a polymer material.

3. A fiber optic cable as claimed in claim 1, wherein the base material is a polyamide 12 material.

4. A fiber optic cable as claimed in claim 3, wherein the base material is Grilamid TR 55.

5. A fiber optic cable as claimed in claim 1, wherein the outer jacket has an elongated transverse cross-section.

6. A fiber optic cable as claimed in claim 5, wherein the elongated transverse cross-section of the outer jacket is obround.

7. A fiber optic cable assembly comprising:
an inner cable assembly having:
an optical fiber;
a first strength layer surrounding the optical fiber;
a first jacket surrounding the first strength layer;
a second jacket surrounding the inner cable assembly, the second jacket including a base material having a Shore D Hardness of at least 85 and liquid crystal polymer embedded in the base material, the liquid crystal polymer constituting less than 2% of the second jacket by weight.

8. The fiber optic cable assembly of claim 7, further comprising a second strength layer positioned between the inner cable assembly and the second jacket.

9. The fiber optic cable assembly of claim 7, further comprising at least one reinforcing member positioned outside the first jacket of the inner cable assembly.

10. The fiber optic cable assembly of claim 9, wherein there are two of the reinforcing members positioned outside the first jacket of the inner cable assembly.

11. The fiber optic cable assembly of claim 10, wherein the reinforcing members are symmetrically arranged about the first jacket.

12. The fiber optic cable assembly of claim 9, wherein the at least one reinforcing member is disposed in a passageway of the second jacket.

13. A fiber optic cable assembly as claimed in claim 7, wherein the base material is a polymer material.

14. A fiber optic cable assembly as claimed in claim 7, wherein the base material is a polyamide 12 material.

15. A fiber optic cable assembly as claimed in claim 14, wherein the base material is Grilamid TR 55.

16. A fiber optic cable assembly as claimed in claim 7, wherein the second jacket has an elongated transverse cross-section.

* * * * *